United States Patent
Iwakura et al.

(10) Patent No.: US 9,606,266 B2
(45) Date of Patent: Mar. 28, 2017

(54) OPTICAL ELEMENT, OPTICAL ELEMENT ARRAY, AND SOLID-STATE IMAGE-PICKUP APPARATUS

(71) Applicant: CANON KABUSHIKI KAISHA, Tokyo (JP)

(72) Inventors: Yasushi Iwakura, Funabashi (JP); Taro Kato, Kawasaki (JP); Mayu Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/676,630

(22) Filed: Apr. 1, 2015

(65) Prior Publication Data
US 2015/0285955 A1   Oct. 8, 2015

(30) Foreign Application Priority Data

Apr. 3, 2014   (JP) .................. 2014-077036

(51) Int. Cl.
| | |
|---|---|
| G02B 1/11 | (2015.01) |
| G02B 3/00 | (2006.01) |
| H04N 5/225 | (2006.01) |
| G02B 13/00 | (2006.01) |

(52) U.S. Cl.
CPC ............. *G02B 1/11* (2013.01); *G02B 3/0006* (2013.01); *G02B 13/0015* (2013.01); *H04N 5/2254* (2013.01)

(58) Field of Classification Search
CPC .... G02B 1/11; G02B 13/0015; G02B 3/0006; H04N 5/2254; H01L 27/14625–27/14629
See application file for complete search history.

(56) References Cited

U.S. PATENT DOCUMENTS

| | | | | |
|---|---|---|---|---|
| 2009/0039454 A1* | 2/2009 | Masuda | .............. | H01L 27/1462 257/432 |
| 2011/0228142 A1* | 9/2011 | Brueckner | ........... | H04N 5/2254 348/241 |
| 2012/0038015 A1* | 2/2012 | Huang | .............. | H01L 27/14625 257/437 |

(Continued)

FOREIGN PATENT DOCUMENTS

| | | | |
|---|---|---|---|
| JP | 2007-335723 A | | 12/2007 |
| JP | 2007335723 A | * | 12/2007 |

(Continued)

OTHER PUBLICATIONS

Machine translation of JP 2007335723 A.*

*Primary Examiner* — Jason Flohre
(74) *Attorney, Agent, or Firm* — Canon U.S.A., Inc. IP Division

(57) ABSTRACT

A convex lens has surfaces including a flat surface and a projecting surface, and an anti-reflection structure configured to cover the projecting surface are included. The anti-reflection structure includes a first anti-reflection structure on the first end side, which is one of two end points of the line segment located nearer to the orthogonal projection of the apex than to the center point thereof, and a second anti-reflection structure on a second end side, which is one of the two end points of the line segment located nearer to the center point than to the orthogonal projection of the apex. A light transmittance of the second anti-reflection structure is greater than a light transmittance of the first anti-reflection structure.

14 Claims, 11 Drawing Sheets

(56) References Cited

U.S. PATENT DOCUMENTS

| | | | |
|---|---|---|---|
| 2012/0050599 A1* | 3/2012 | Chen .................. | H01L 27/1462 348/336 |
| 2012/0086093 A1* | 4/2012 | Otsuka .............. | H01L 27/14621 257/432 |

FOREIGN PATENT DOCUMENTS

| | | |
|---|---|---|
| JP | 4796287 B2 | 10/2011 |
| JP | 2012-507250 A | 3/2012 |

* cited by examiner

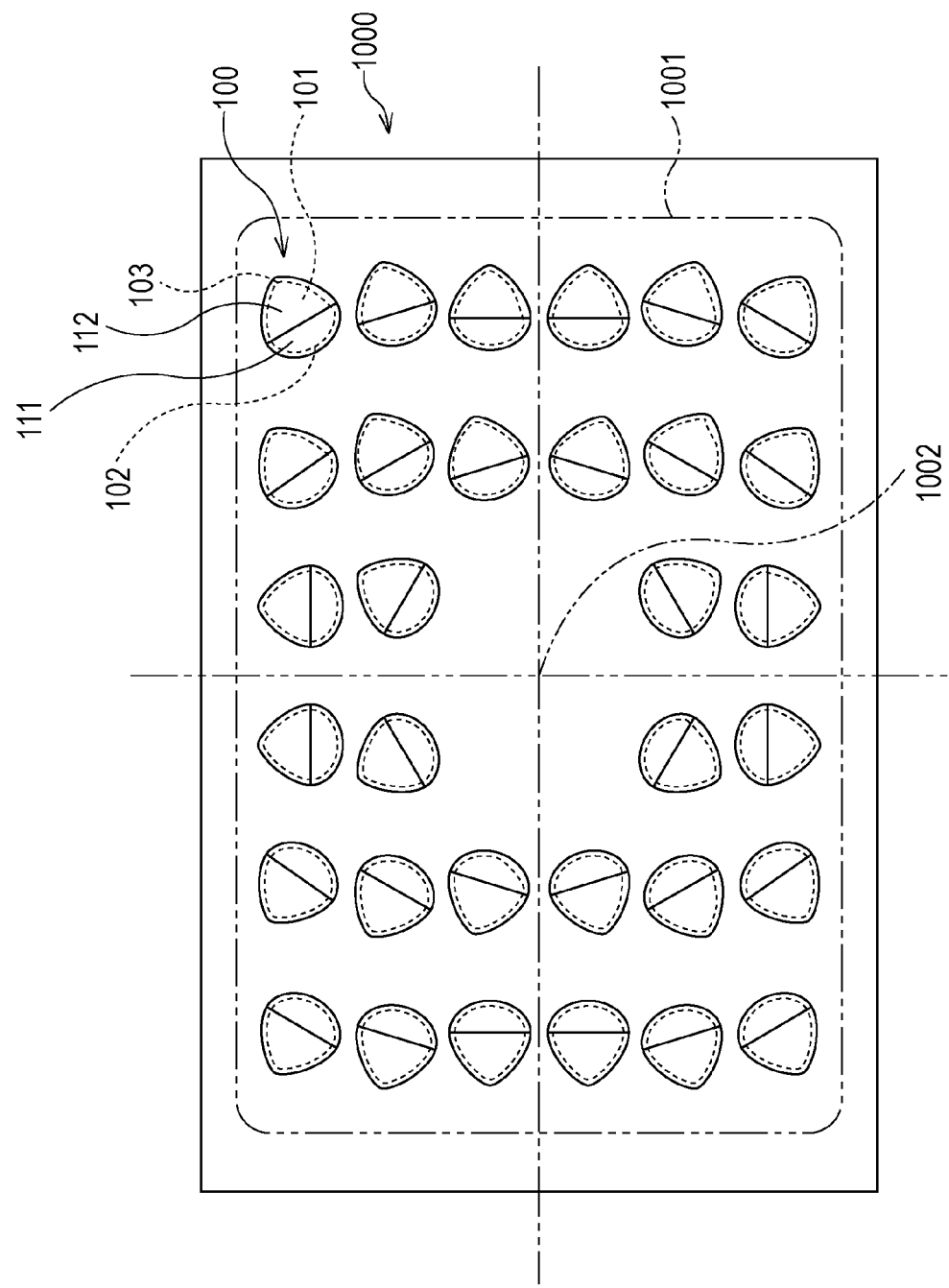

OPTICAL ELEMENT, OPTICAL ELEMENT ARRAY, AND SOLID-STATE IMAGE-PICKUP APPARATUS

BACKGROUND

Field of the Invention

This disclosure relates to an optical element, an optical element array, and a solid-state image-pickup apparatus.

Description of the Related Art

A solid-state image-pickup apparatus provided with an optical element such as a micro lens is known. PCT Japanese Translation Patent Publication No. 2012-507250 discloses that the micro lens in an optical image apparatus may have a non-spherical surface, and that an anti-reflection coating may be applied to a surface of the micro lens. However, in PCT Japanese Translation Patent Publication No. 2012-507250, a configuration of an anti-reflection film suitable for a micro lens having an asymmetrical curved surface has not been examined. This disclosure provides an optical element, an optical element array, and a solid-state image-pickup apparatus having a suitable anti-reflection structure.

SUMMARY

This disclosure provides an optical element including: a bottom face; a convex lens including a projecting surface attached to the bottom face; an anti-reflection structure configured to cover the projecting surface; and an orthogonal projection of an apex of the projecting surface onto the bottom face being located on a line segment connecting a first end located on an outer edge of the bottom face and a second end located on the outer edge of the bottom face, and being located on the first end side with respect to a center point of the line segment, wherein the anti-reflection structure includes a first anti-reflection structure on the first end side with respect to the apex, and a second anti-reflection structure on the second end side with respect to the apex, and wherein a light transmittance of the second anti-reflection structure is greater than a light transmittance of the first anti-reflection structure.

This disclosure provides an optical element array including a plurality of optical elements located in an array region at a distance from each other, wherein each of the plurality of optical elements includes: a convex lens including a bottom face and a projecting surface; and an anti-reflection structure configured to cover the projecting surface, and an orthogonal projection of an apex of the projecting surface onto the bottom face being located on a line segment connecting a first end located on an outer edge of the bottom face and a second end located on the outer edge of the bottom face at a position further from the center of the array region than the first end, and being located on the first end side with respect to a center point of the line segment, wherein the anti-reflection structure includes a first anti-reflection structure on the first end side with respect to the apex, and a second anti-reflection structure on the second end side with respect to the apex, and wherein light transmittance of the second anti-reflection structure is greater than light transmittance of the first anti-reflection structure.

This disclosure provides a solid-state image-pickup apparatus including: a plurality of photoelectric conversion portions disposed in an array region, an optical element array provided on the plurality of photoelectric conversion portions and including a plurality of optical elements, wherein each of the plurality of optical elements include: a convex lens including a bottom face and a projecting surface; and an anti-reflection structure configured to cover the projecting surface, and an orthogonal projection of an apex of the projecting surface onto the bottom face being located on a line segment connecting a first end located on an outer edge of the bottom face and a second end located on the outer edge of the bottom face at a position further from the center of the array region than the first end, and being located on the first end side with respect to a center point of the line segment, wherein the anti-reflection structure includes a first anti-reflection structure on the first end side with respect to the apex, and a second anti-reflection structure on the second end side with respect to the apex, and wherein light transmittance of the second anti-reflection structure is greater than light transmittance of the first anti-reflection structure.

Further features of the present invention will become apparent from the following description of exemplary embodiments with reference to the attached drawings.

BRIEF DESCRIPTION OF THE DRAWINGS

FIG. 11 is a top view illustrating a structure of an optical element array of an eleventh embodiment.

DESCRIPTION OF THE EMBODIMENTS

Hereinafter, embodiments of this disclosure will be described in detail with reference to the attached drawings.

First Embodiment

Figure 1A:
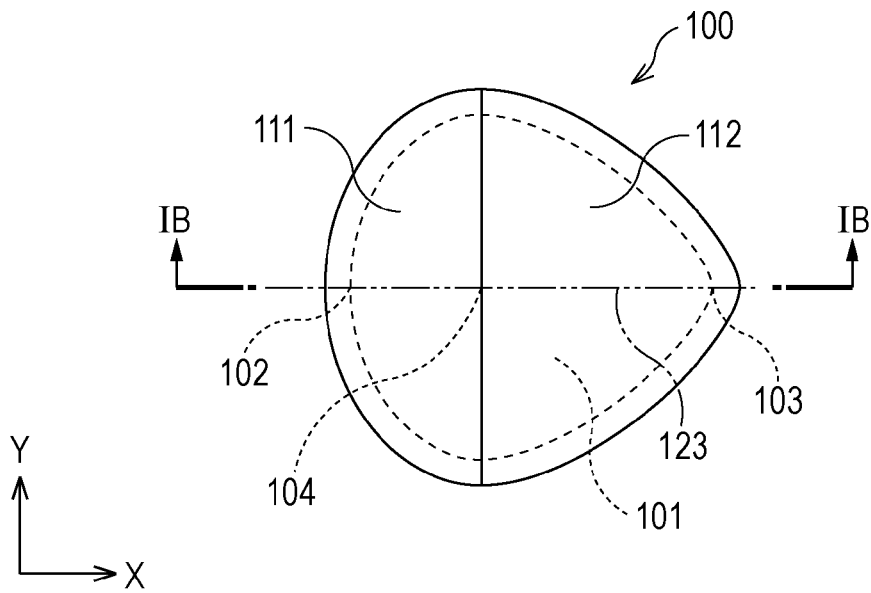
FIGS. 1A and 1B are drawings illustrating a structure of an optical element of a first embodiment.
Figure 1B:
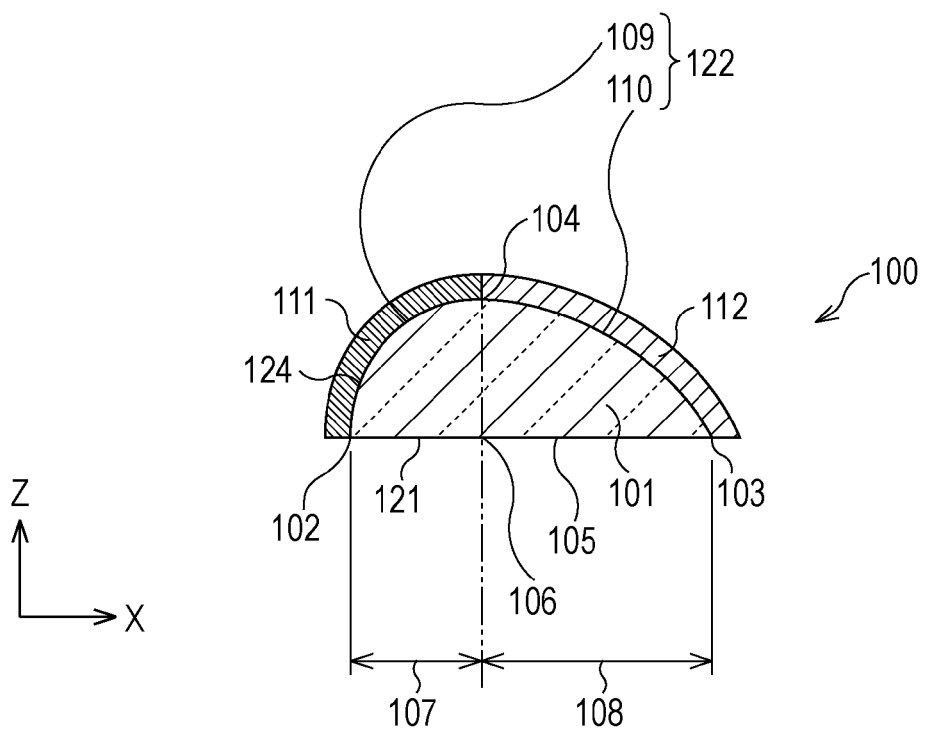

A first embodiment of this disclosure will be described. FIGS. 1A and 1B are drawings illustrating a structure of an optical element of the first embodiment. FIG. 1A is a top view and FIG. 1B is a cross-sectional view taken along the line IB-IB in FIG. 1A.

An optical element 100 of the first embodiment includes a convex lens 101. A surface of the convex lens 101 includes a flat surface (bottom face) 121 and a projecting surface 122 connected thereto. A surface including the flat surface 121 is referred to as an XY plane of an orthogonal coordinate system, hereinafter. The projecting surface 122 is substantially plane symmetrical with respect to one flat surface 123 perpendicular to the flat surface 121 and including an apex 104 of the projecting surface 122. The projecting surface of a general convex lens constitutes part of a spherical shape, but the shape of the projecting surface 122 constitutes part of a non-spherical shape. A first end 102 and a second end 103 of a line of intersection 124 between the flat surface 123, which is a reference of the plane symmetry, and the projecting surface 122 is on the XY plane. An orthogonal projection 106 of the apex 104 onto the XY plane is on a line segment 105 having two end points at the first end 102 and the second end 103. The orthogonal projection 106 of the apex 104 is at a position biased toward one of the end points from a center point (not illustrated) of the line segment 105, which is a position biased toward the first end 102 in this case. In other words, the first end 102 of the two end points of the line segment 105 is located nearer to the orthogonal projection 106 of the apex 104 than to the center point thereof, and the second end 103 out of the two end points of the line segment 105 is located nearer to the center point than to the orthogonal projection 106 of the apex 104. Therefore, a distance 107 between the orthogonal projection 106 of the apex 104 and the first end 102 is shorter than a distance 108 between the orthogonal projection 106 of the apex 104 and the second end 103. Assuming that the line segment 105 is on an X-axis and an X coordinate of the first end 102 is smaller than an X coordinate of the second end 103, the X coordinate of the second end 103 is smallest and the X coordinate of the second end 103 is the largest among the X coordinates of respective points which constitute the line of intersection between the flat surface 121 and the projecting surface 122. Such a convex lens having a curved surface shape without rotational symmetry may be referred to as a tear drop type, and is described in, for example, Japanese Patent No. 4796287 and Japanese Patent Laid-Open No. 2007-335723. Here, when the optical element 100 is located on a flat plate member, the flat surface (bottom face) 121 may not constitute part of the surface. In this case, the flat surface 121 may be considered a surface with which the projecting surface 122 is in contact. For example, in the first embodiment, the flat surface 121 may be considered a plane including a Z-axis coordinate at the lowest position of the projecting surface 122 (a plane parallel to an XY axis).

The projecting surface 122 is divided into a first outer edge 109 and a second outer edge 110. The boundary between the first outer edge 109 and the second outer edge 110 constitutes a curved line included in the projecting surface 122, passing through the apex 104, and having an orthogonal projection to the bottom face thereof extending orthogonally to the line segment 105. A first anti-reflection structure 111 is provided on the first outer edge 109 on the first end 102 side of the apex 104 and a second anti-reflection structure 112 is provided on the second outer edge 110 on the second end 103 side of the apex 104. The light transmittance of the second anti-reflection structure 112 is greater than the light transmittance of the first anti-reflection structure 111.

Since the convex lens 101 has the configuration described above, the second anti-reflection structure 112 tends to affect an amount of light received by of a photoelectric conversion portion, and the first anti-reflection structure 111 tends to affect the color phase of a light beam detected by the photoelectric conversion portion. In this embodiment, the light transmittance of the first anti-reflection structure 111 is lower than that of the second anti-reflection structure 112. Therefore, according to this embodiment, oblique-incidence light can be reduced while securing light-converging properties of the optical element 100. In addition, since the surface area of the orthogonal projection image on the XY plane of the second anti-reflection structure 112 is larger than that of the first anti-reflection structure 111, the amount of light obliquely incident may be reduced while further maintaining the light converging properties. The optical element 100 of the first embodiment may be applied, for example, to a solid-state image-pickup apparatus. By applying the optical element 100 as described above to the solid-state image-pickup apparatus, color mixing may be restrained while securing the light-receiving amount of the photoelectric conversion portion, that is, the sensitivity properties, successfully. In other words, with the optical element 100 of this embodiment, the oblique-incidence light beam may be passed and converged with little light loss.

According to the first embodiment, light converging efficiency can be maintained more than in a configuration in which a light-shielding film is provided on the first outer edge 109, even under a circumstance in which an amount of incident light is small and, when the optical element of the first embodiment is applied to the solid-state image-pickup apparatus of the first embodiment, the sensitivity of the photoelectric conversion portion may be maintained.

The light transmittance of the first anti-reflection structure 111 and the light transmittance of the second anti-reflection structure 112 do not have to be constant. For example, the light transmittances may be continuously changed from the first end 102 toward the second end 103. In such a case, light transmittance is preferably increased gradually from the first end 102 toward the second end 103. The light transmittance of the first anti-reflection structure 111 and the light transmittance of the second anti-reflection structure 112 may be discontinuous. In addition, the boundary between the first anti-reflection structure 111 and the second anti-reflection structure 112 does not have to be located at the boundary between the first outer edge 109 and the second outer edge 110. For example, the boundary between the first anti-reflection structure 111 and the second anti-reflection structure 112 may be located at the first end 102 side of the apex 104. In other words, the second anti-reflection structure 112 may be provided on part of the first outer edge 109. By covering the apex 104 with the second anti-reflection structure 112, the light converging efficiency may be further improved.

For example, a known inorganic compound or organic compound applied to an anti-reflection film may be used as a material of the first anti-reflection structure 111 and the second anti-reflection structure 112. Specifically, metallic fluoride such as $MgF_2$, $CaF_2$, metallic oxide such as SiO, $Al_2O_3$, metallic nitride such as SiN, a polymer of a carbon skeleton or a silicon skeleton containing fluorine, and a polymer of a silicon skeleton containing oxygen may be used.

In the case where an inorganic compound is used as the material of the first anti-reflection structure 111 and the second anti-reflection structure 112, deposition thereof is achieved by a known gas-phase film forming method such as a chemical vapor deposition method (CVD method), a sputtering method, and an ion film forming method. Also, for pattern formation of the inorganic compound film, a method of arranging a mask having apertures corresponding to a desired pattern between a film-forming material and a film-forming object by a gas-phase film formation, a method of combining isotropic or anisotropic gas-phase film formation and isotropic or anisotropic dry etching, and a method such as photolithography may be applied.

In the case where the inorganic compound is used as the material of the first anti-reflection structure 111 and the second anti-reflection structure 112, deposition thereof is achieved by a known wet film forming method such as a spin coat method, a roll coat method, and a spray coat method.

Also, for pattern formation of the organic compound film, methods such as photolithography of the film forming material, photolithography using a different type of resist mask material, and dry etching may be applied.

Second Embodiment

Figure 2A:
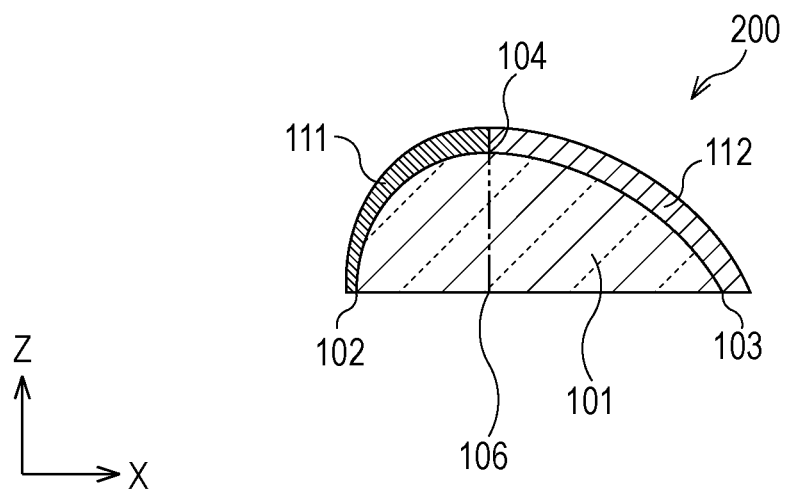
FIGS. 2A and 2B are drawings illustrating a structure of an optical element of second and third embodiments.

A second embodiment will be described. FIG. 2A is a cross-sectional view illustrating a structure of an optical element of the second embodiment. In the second embodiment, the same components as in the first embodiment are denoted by the same reference numerals and description thereof is omitted.

With an optical element 200 of the second embodiment, an optical film thickness differs between the first anti-reflection structure 111 and the second anti-reflection structure 112. Here, the optical film thickness is a product of a refractive index n and a thickness d of a film that covers the convex lens 101. In the second embodiment, a covering layer which constitutes part of the first anti-reflection structure 111 is thinner than a covering layer which constitutes part of the second anti-reflection structure 112.

Figure 3A:
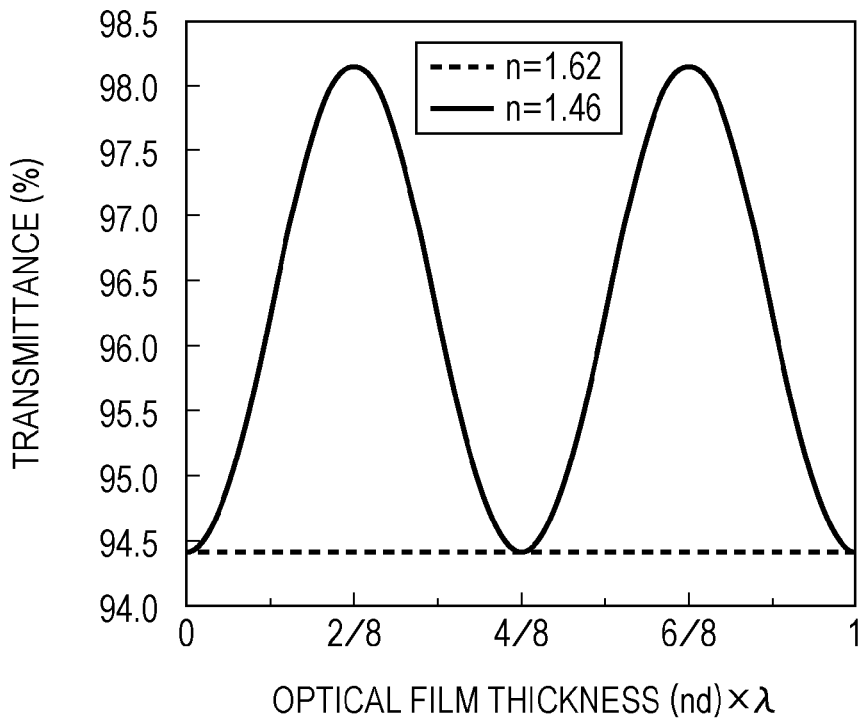
FIG. 3A is a graph illustrating a relationship between an optical film thickness and a transmittance.
Figure 3B:
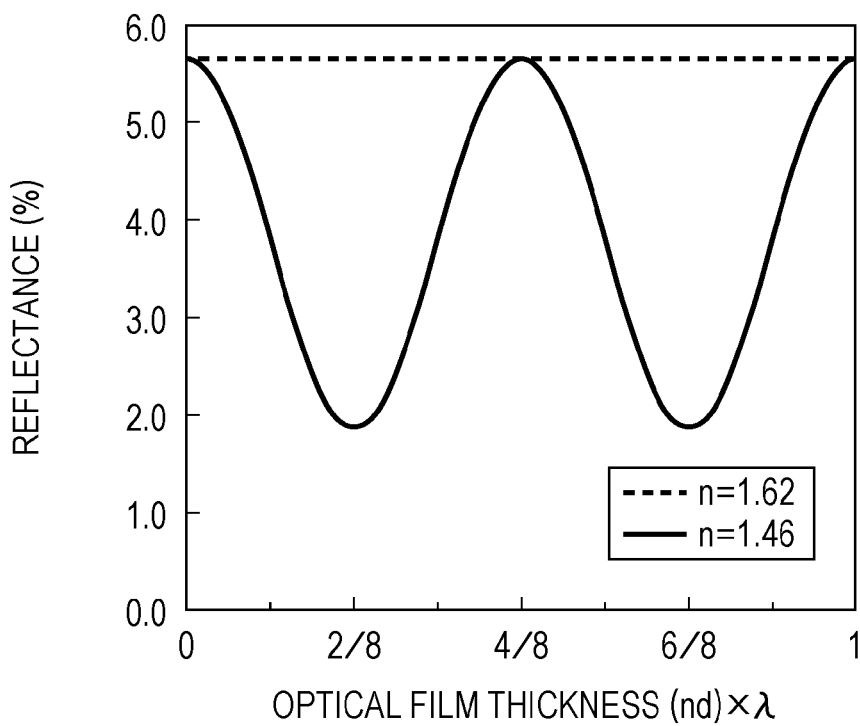
FIG. 3B is a graph illustrating a relationship between the optical film thickness and a reflectance.

FIG. 3A illustrates a relationship between the optical film thickness and the transmittance of a covering layer (refractive index n=1.46) provided on a substrate (refractive index n=1.62) having the same composition as the convex lens, and FIG. 3B illustrates a relationship between the optical film thickness and the reflectance of the covering layer. Preferably, from the relationship illustrated in FIGS. 3A and 3B, the optical film thickness ($n_1 d_1$) of the first anti-reflection structure 111 satisfies the relationship of Expression 1 given below, and the optical film thickness ($n_2 d_2$) of the second anti-reflection structure 112 satisfies the relationship of Expression 2 given below. In Expression 1 and Expression 2, λ is a wavelength of light falling on the optical element, and $m_1$ and $m_2$ are integers. Also, $n_1$ and $d_1$ are a refractive index and a thickness of the covering layer corresponding to the first anti-reflection structure 111 respectively, and $n_2$ and $d_2$ are a refractive index and a thickness of the covering layer corresponding to the second anti-reflection structure 112, respectively.

$$\frac{3\lambda}{8} + \frac{m_1 \lambda}{2} < n_1 d_1 < \frac{5\lambda}{8} + \frac{m_1 \lambda}{2} \quad \text{Expression 1}$$

$$\frac{\lambda}{8} + \frac{m_2 \lambda}{2} \leq n_2 d_2 \leq \frac{3\lambda}{8} + \frac{m_2 \lambda}{2} \quad \text{Expression 2}$$

For example, in the case where the wavelength of the incident light is 550 nm, and the material of the covering layer is SiO (refractive index n=1.46), preferably, the thickness of the covering layer which constitutes part of the first anti-reflection structure 111 is smaller than 47 nm, and the thickness of the covering layer which constitutes part of the second anti-reflection structure 112 is 94±47 nm.

The same advantages and effects as those in the first embodiment are achieved with the second embodiment as described above. In addition, since the optical film thickness differs between the first anti-reflection structure 111 and the second anti-reflection structure 112, an effect of restraining ghosting which tends to be generated by the oblique-incidence light beam falling on the first outer edge 109 at a bent portion having locally a large curvature locally.

Third Embodiment

Figure 2B:
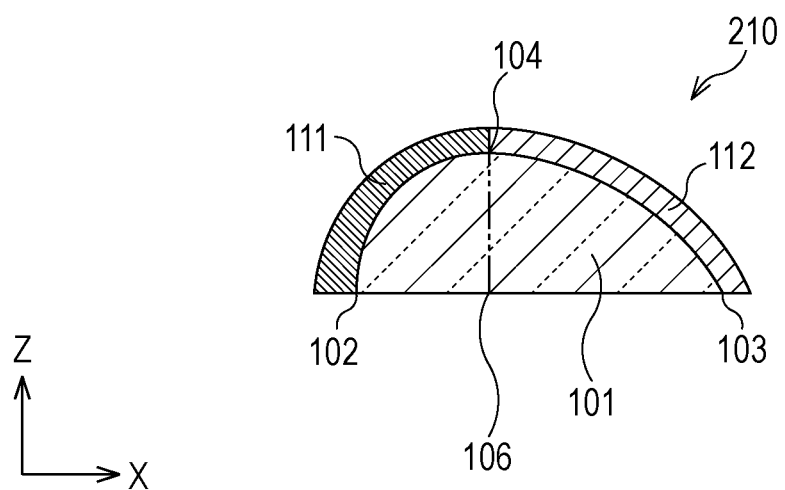

A third embodiment will be described. FIG. 2B is a cross-sectional view illustrating a structure of an optical element of the third embodiment. In the third embodiment, same components as in the first embodiment are denoted by the same reference numerals and description thereof is omitted.

With an optical element 210 of the third embodiment, an optical film thickness differs between the first anti-reflection structure 111 and the second anti-reflection structure 112. However, unlike the second embodiment, a covering layer which constitutes part of the first anti-reflection structure 111 is thicker than a covering layer which constitutes part of the second anti-reflection structure 112.

In the same manner as the second embodiment, preferably, the optical film thickness ($n_1 d_1$) of the first anti-reflection structure 111 satisfies the relationship of Expression 1, and the optical film thickness ($n_2 d_2$) of the second anti-reflection structure 112 satisfies the relationship of Expression 2.

For example, in the case where the wavelength of the incident light is 550 nm, and the material of the covering layer is SiO (refractive index n=1.46), preferably, the thickness of the covering layer which constitutes part of the first anti-reflection structure 111 is 188±47 nm, and the thickness of the covering layer which constitutes part of the second anti-reflection structure 112 is 94±47 nm.

The same advantages and effects as those in the first embodiment are achieved with the third embodiment as described above. In addition, since the optical film thickness differs between the first anti-reflection structure 111 and the second anti-reflection structure 112, an effect of restraining ghosting which tends to be generated by the oblique-incidence light beam falling on the first outer edge 109 at the bent portion having locally a large curvature.

Fourth Embodiment

Figure 4A:
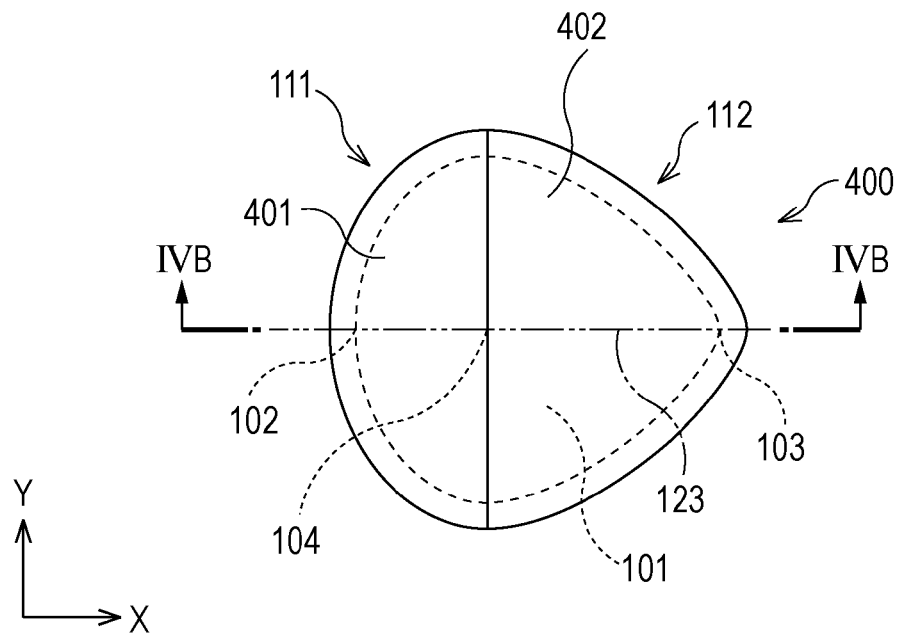
FIGS. 4A and 4B are drawings illustrating a structure of an optical element of a fourth embodiment.
Figure 4B:
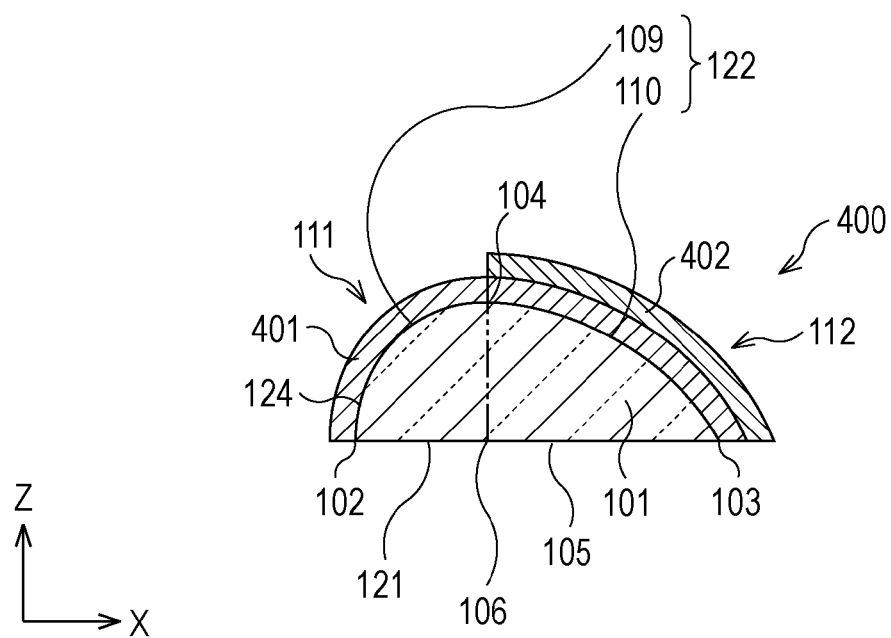

A fourth embodiment will be described. FIGS. 4A and 4B are drawings illustrating a structure of an optical element of the fourth embodiment. FIG. 4A is a top view and FIG. 4B is a cross-sectional view taken along the line IVB-IVB in FIG. 4A. In the fourth embodiment, same components as in the first embodiment are denoted by the same reference numerals and description thereof is omitted.

In an optical element 400 of the fourth embodiment, a first covering layer 401 is formed on the first outer edge 109 and the second outer edge 110. In other words, the first covering layer 401 is formed on the entire part of the projecting surface 122. A second covering layer 402 is formed on part of the second outer edge 110 of the first covering layer 401. Part of the first outer edge 109 of the first covering layer 401 is included in the first anti-reflection structure 111, and part of the second outer edge 110 of the first covering layer 401 and the second covering layer 402 are included in the second anti-reflection structure 112. For example, the first covering layer 401 is a SiN (refractive index n=1.82) film having a thickness of 64 nm, and the second covering layer 402 is a SiO (refractive index n=1.46) film having a thickness of 94 nm.

In the fourth embodiment as described above, in the same manner as the second and third embodiments, the optical film thickness differs between the first anti-reflection structure 111 and the second anti-reflection structure 112. Therefore, the same advantages and effects as those in the second and third embodiments are achieved. In the same manner as the second and third embodiments, preferably, the optical film thickness of the first anti-reflection structure 111 satisfies the relationship of Expression 1, and the optical film thickness of the second anti-reflection structure 112 satisfies the relationship of Expression 2 in the fourth embodiment as well.

Fifth Embodiment

Figure 5A:
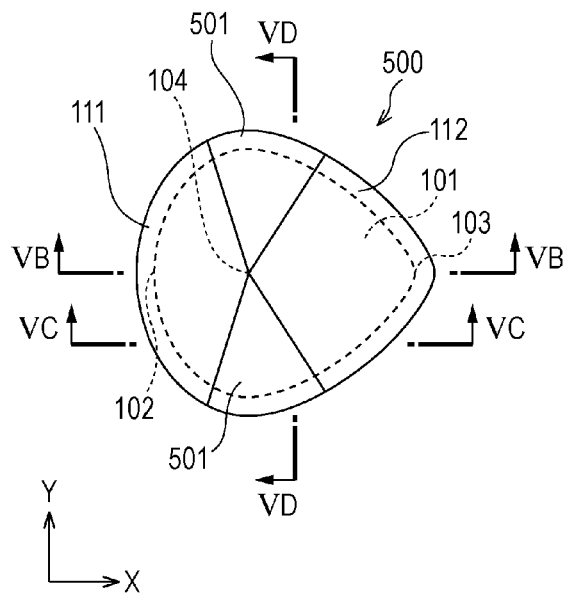
FIGS. 5A to 5D are drawings illustrating a structure of an optical element of a fifth embodiment.
Figure 5B:
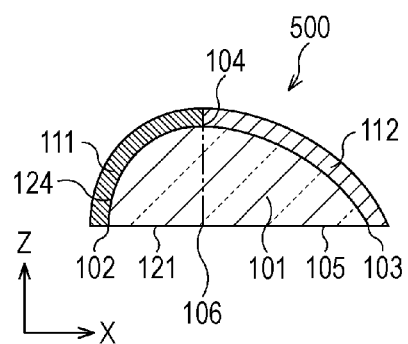
Figure 5C:
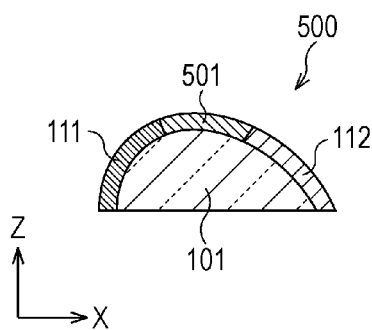
Figure 5D:
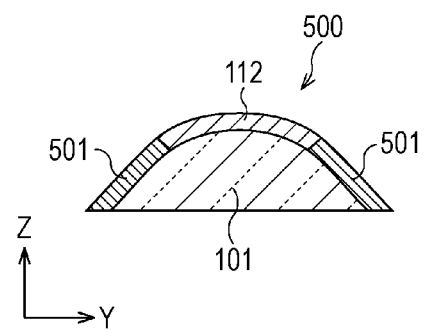

A fifth embodiment will be described. FIGS. 5A to 5D are drawings illustrating a structure of an optical element of the fifth embodiment. FIG. 5A is a top view, FIG. 5B is a cross-sectional view taken along the line VB-VB in FIG. 5A, FIG. 5C is a cross-sectional view taken along the line VC-VC in FIG. 5A, and FIG. 5D is a cross-sectional view taken along the line VD-VD in FIG. 5A. In the fifth embodiment, same components as in the first embodiment are denoted by the same reference numerals and description thereof is omitted.

In an optical element 500 of the fifth embodiment, a third anti-reflection structure 501 configured to cover the boundary between the first outer edge 109 and the second outer edge 110 is formed. The third anti-reflection structure 501 is located between the first anti-reflection structure 111 and the second anti-reflection structure 112. The first anti-reflection structure 111 and the second anti-reflection structure 112 are in contact with each other on the apex 104. The light transmittance of the second anti-reflection structure 112 is greater than the light transmittance of the third anti-reflection structure 501. The light transmittance of the first anti-reflection structure 111 is greater than the light transmittance of the third anti-reflection structure 501. In other words, the light transmittance of the first anti-reflection structure 111 is the same as, or lower than the light transmittance of the third anti-reflection structure 501.

A portion on the boundary between the first outer edge 109 and the second outer edge 110 at a position corresponding to the outer edge of the bottom face of the optical element 500 is a portion where curved surfaces formed by the adjacent optical elements 500 intersect, or a portion where the curved surface formed by the optical element 500 and a flat surface on which the optical element 500 is arranged intersect. In other words, the portion described above is a bent portion where the curvature varies locally, and part of the incident light beam therethrough may not fall on the photoelectric conversion portion arranged below the optical element 500 and may fall erroneously on the adjacent photoelectric conversion portion. However, with the optical element 500 of the fifth embodiment, the third anti-reflection structure 501 is provided on such a portion. Therefore, the light beam falling obliquely on the optical element 500 may be passed and converged through the photoelectric conversion portion which forms a pair with the optical element 500 with a little light loss and erroneous incidence on the adjacent photoelectric conversion portion may be restrained.

Sixth Embodiment

Figure 6A:
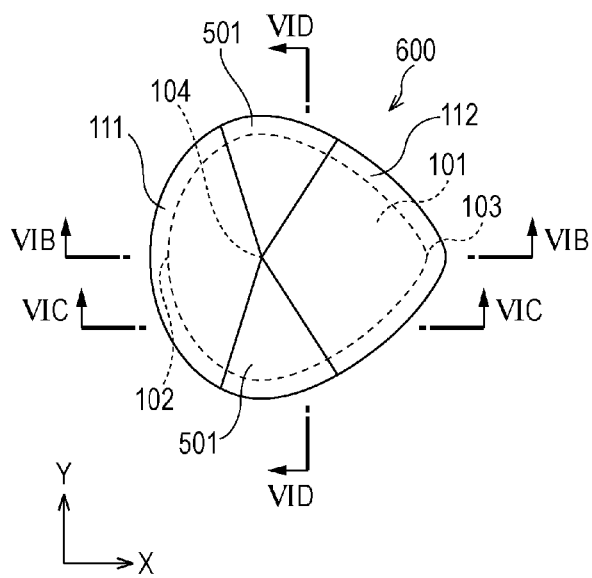
FIGS. 6A to 6D are drawings illustrating a structure of an optical element of a sixth embodiment.
Figure 6B:
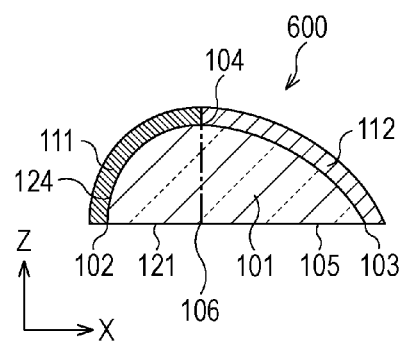
Figure 6C:
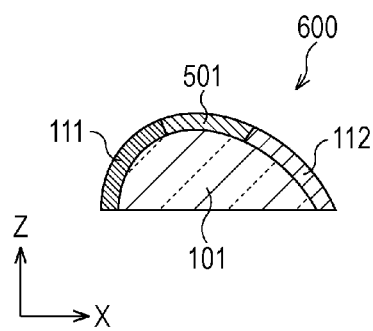
Figure 6D:
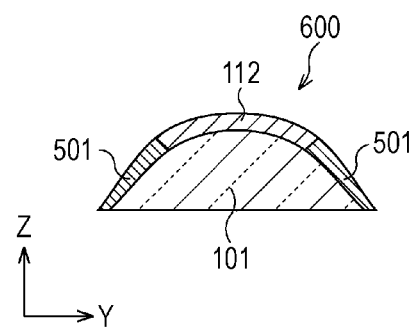

A sixth embodiment will be described. FIGS. 6A to 6D are drawings illustrating a structure of an optical element according to the sixth embodiment. FIG. 6A is a top view, FIG. 6B is a cross-sectional view taken along the line VIB-VIB in FIG. 6A, FIG. 6C is a cross-sectional view taken along the line VIC-VIC in FIG. 6A, and FIG. 6D is a cross-sectional view taken along the line VID-VID in FIG. 6A. In the sixth embodiment, same components as in the first embodiment are denoted by the same reference numerals and description thereof is omitted.

In an optical element 600 of the sixth embodiment, an optical film thickness differs between the second anti-reflection structure 112 and the third anti-reflection structure 501. More specifically, a covering layer which constitutes part of the third anti-reflection structure 501 is thinner than a covering layer which constitutes part of the second anti-reflection structure 112. Preferably, the optical film thickness ($n_2 d_2$) of the second anti-reflection structure 112 satisfies the relationship of Expression 2, and an optical film thickness ($n_3 d_3$) of the third anti-reflection structure 501 satisfies the relationship of Expression 3 given below. In Expression 3, $\lambda$ is a wavelength of light falling on the optical element, and $m_3$ is an integer. Also, $n_3$ and $d_3$ are a refractive index and a thickness of the covering layer corresponding to the third anti-reflection structure 501.

$$\frac{\lambda}{8} + \frac{m_2 \lambda}{2} \leq n_2 d_2 \leq \frac{3\lambda}{8} + \frac{m_2 \lambda}{2} \qquad \text{Expression 2}$$

$$\frac{3\lambda}{8} + \frac{m_3 \lambda}{2} < n_3 d_3 < \frac{5\lambda}{8} + \frac{m_3 \lambda}{2} \qquad \text{Expression 3}$$

For example, in the case where the wavelength of the incident light is 550 nm, and the material of the covering layer is SiO (refractive index n=1.46), preferably, the thickness of the covering layer which constitutes part of the third anti-reflection structure 501 is smaller than 47 nm, and the thickness of the covering layer which constitutes part of the second anti-reflection structure 112 is 94±47 nm.

The same advantages and effects as those in the embodiments described above are achieved with the sixth embodiment as described above.

Seventh Embodiment

Figure 7A:
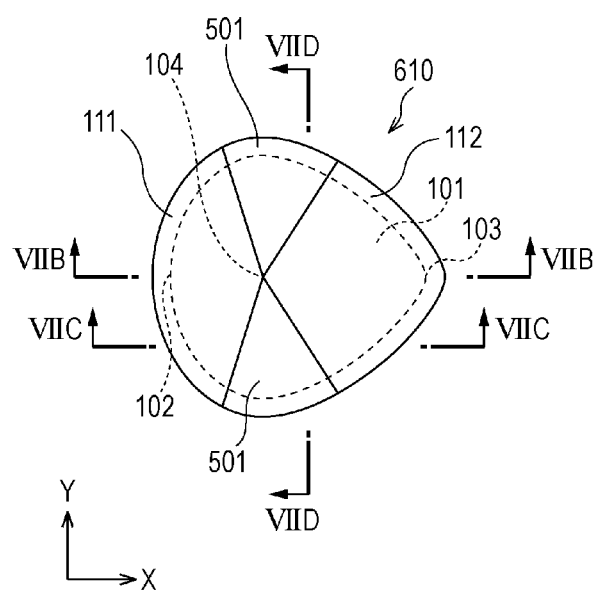
FIGS. 7A to 7D are drawings illustrating a structure of an optical element of a seventh embodiment.
Figure 7B:
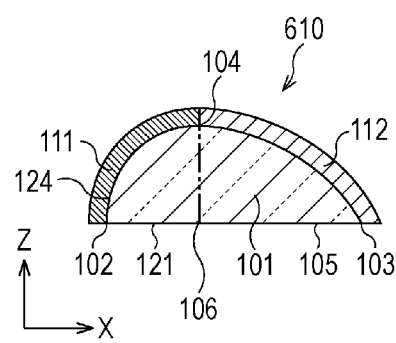
Figure 7C:
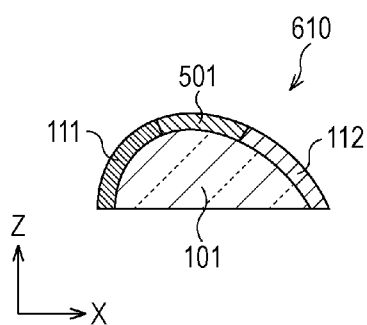
Figure 7D:
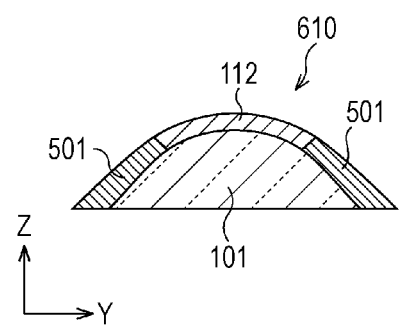

A seventh embodiment will be described. FIGS. 7A to 7D are drawings illustrating a structure of an optical element according to the seventh embodiment. FIG. 7A is a top view, FIG. 7B is a cross-sectional view taken along the line VIIB-VIIB in FIG. 7A, FIG. 7C is a cross-sectional view taken along the line VIIC-VIIC in FIG. 7A, and FIG. 7D is a cross-sectional view taken along the line VIID-VIID in FIG. 7A. In the seventh embodiment, same components as in the first embodiment are denoted by the same reference numerals and description thereof is omitted.

In an optical element 610 of the seventh embodiment, an optical film thickness differs between the second anti-reflection structure 112 and the third anti-reflection structure 501. However, unlike the sixth embodiment, the covering layer which constitutes part of the third anti-reflection structure 501 is thicker than the covering layer which constitutes part of the second anti-reflection structure 112.

In the same manner as the sixth embodiment, preferably, the optical film thickness ($n_2 d_2$) of the second anti-reflection structure 112 satisfies the relationship of Expression 2, and the optical film thickness ($n_3 d_3$) of the third anti-reflection structure 501 satisfies the relationship of Expression 3.

For example, in the case where the wavelength of the incident light is 550 nm, and the material of the covering layer is SiO (refractive index n=1.46), preferably, the thickness of the covering layer which constitutes part of the third anti-reflection structure 501 is 188±47 nm, and the thickness of the covering layer which constitutes part of the second anti-reflection structure 112 is 94±47 nm.

The same advantages and effects as those in the second embodiment and the same advantages and effects as those in the fifth embodiment are achieved with the seventh embodiment as described above.

Eighth Embodiment

Figure 8A:
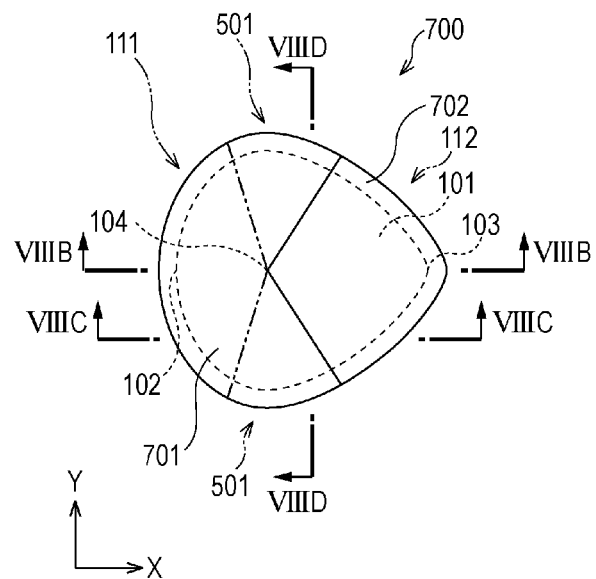
FIGS. 8A to 8D are drawings illustrating a structure of an optical element of an eighth embodiment.
Figure 8B:
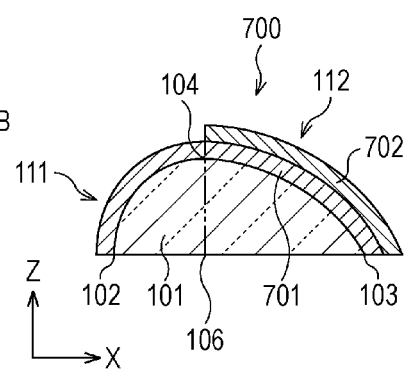
Figure 8C:
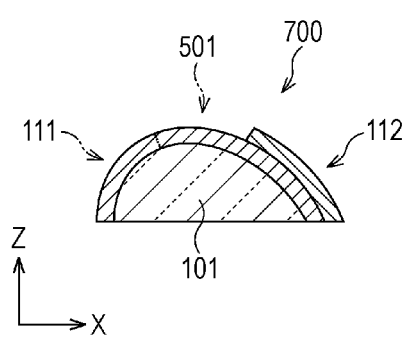
Figure 8D:
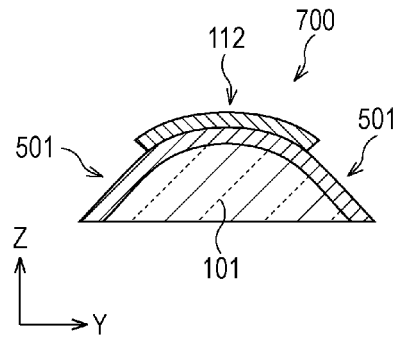

An eighth embodiment will be described. FIGS. 8A to 8D are drawings illustrating a structure of an optical element according to the eighth embodiment. FIG. 8A is a top view, FIG. 8B is a cross-sectional view taken along the line VIIIB-VIIIB in FIG. 8A, FIG. 8C is a cross-sectional view taken along the line VIIIC-VIIIC in FIG. 8A, and FIG. 8D is a cross-sectional view taken along the line VIIID-VIIID in FIG. 8A. In the eighth embodiment, same components as in the first embodiment are denoted by the same reference numerals and description thereof is omitted.

In an optical element 700 of the eighth embodiment, a first covering layer 701 is formed on the first outer edge 109 and the second outer edge 110. In other words, the first covering layer 701 is formed on the entire part of the projecting surface 122. A second covering layer 702 is formed on part of the second outer edge 110 of the first covering layer 701 except for a portion in the vicinity of the first outer edge 109 and the second outer edge 110. The portion in the vicinity of the first outer edge 109 and the second outer edge 110 of the first covering layer 701 is included in the third anti-reflection structure 501. The portion except for the vicinity of the first outer edge 109 and the second outer edge 110 on the first outer edge 109 of the first covering layer 701 is included in the first anti-reflection structure 111. The portion except for the vicinity of the first outer edge 109 and the second outer edge 110 on the second outer edge 110 of the first covering layer 701 and the second covering layer 702 are included in the second anti-reflection structure 112. For example, the first covering layer 701 is a SiN (refractive index n=1.82) film having a thickness of 64 nm, and the second covering layer 702 is a SiO (refractive index n=1.46) film having a thickness of 94 nm.

The same advantages and effects as those in the sixth and seventh embodiments are achieved with the eighth embodiment as described above. In the eighth embodiment, in the same manner as the sixth and seventh embodiments, preferably, the optical film thickness of the third anti-reflection structure 501 satisfies the relationship of Expression 3, and the optical film thickness of the second anti-reflection structure 112 satisfies the relationship of Expression 2. The light transmittance of the first anti-reflection structure 111 may be lower than the light transmittance of the third anti-reflection structure 501. In the sixth to eighth embodiments, a fourth anti-reflection structure configured to overlap with an intersecting point of the first to third anti-reflection structures may be provided.

Ninth Embodiment

Figure 9A:
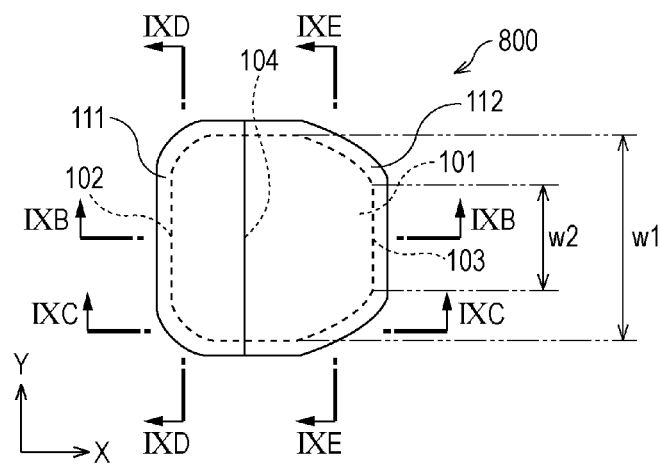
FIGS. 9A to 9E are drawings illustrating a structure of an optical element of a ninth embodiment.
Figure 9B:
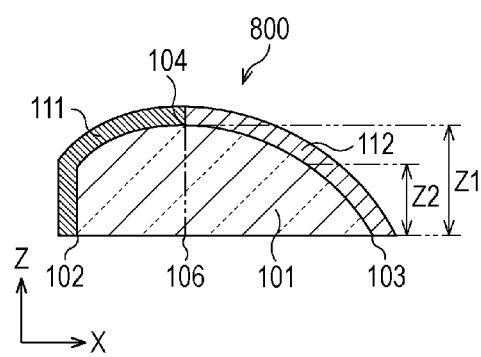
Figure 9C:
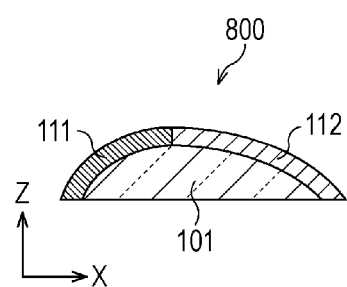
Figure 9D:
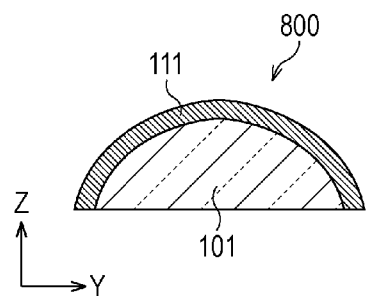
Figure 9E:
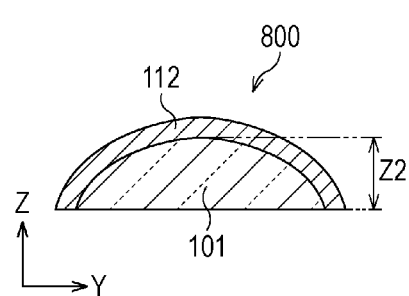

A ninth embodiment will be described. FIGS. 9A to 9E are drawings illustrating a structure of an optical element according to the ninth embodiment. FIG. 9A is a top view, FIG. 9B is a cross-sectional view taken along a line IXB-IXB in FIG. 9A, and FIG. 9C is a cross-sectional view taken along the line IXC-IXC in FIG. 9A. FIG. 9D is a cross-sectional view taken along the line IXD-IXD in FIG. 9A, and FIG. 9E is a cross-sectional view taken along the line IXE-IXE in FIG. 9A. In the ninth embodiment, same components as in the first embodiment are denoted by the same reference numerals and description thereof is omitted.

In the ninth embodiment, a convex lens width w2 at the second end 103 is smaller than a convex lens width w1 of the orthogonal projection 106 where the size of the convex lens 101 on the flat surface 121 in a direction orthogonal to the line segment 105. The convex lens width at the first end 102 is also smaller than the convex lens width w1 of the orthogonal projection 106. In addition, the convex lens width at the first end 102 is larger than the convex lens width w2 at the second end 103. In addition, a height Z1 of the convex lens 101 at the apex 104 is larger than a height Z2 of the convex lens 101 at all points which constitute part of the second outer edge 110 above the line segment 105.

In the ninth embodiment as described above, the surface area occupied by the second anti-reflection structure 112 with respect to the surface area of an optical element 800 is larger than the surface area occupied by the second anti-reflection structure 112 with respect to the surface area of the optical element 100 of the first embodiment. Therefore, in an aspherical optical element having a curved surface without rotational symmetry, a large surface area may be secured as the surface of the optical element available specifically for the light incidence. Therefore, the oblique-incidence light beam may be passed and converged with a small light loss, and hence the amount of light received by of the photoelectric conversion portion arranged below the optical element 800 may be increased.

Tenth Embodiment

Figure 10A:
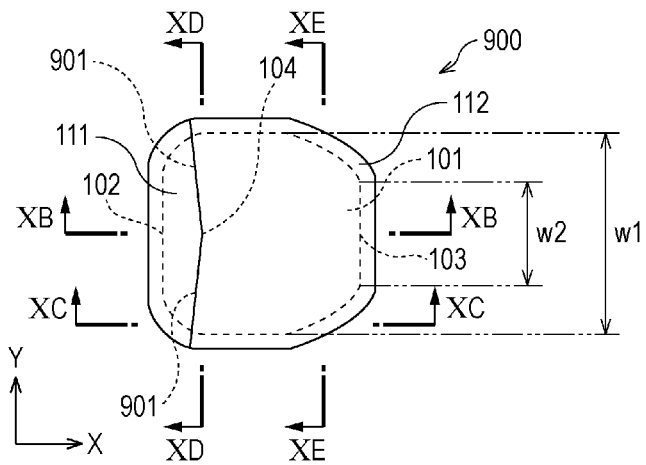
FIGS. 10A to 10E are drawings illustrating a structure of an optical element of a tenth embodiment.
Figure 10B:
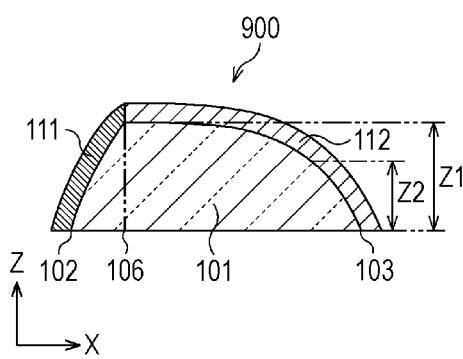
Figure 10C:
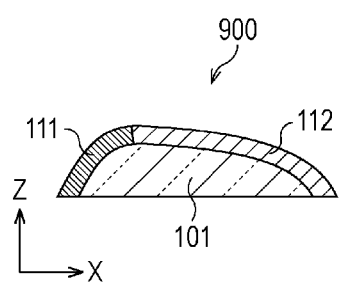
Figure 10D:
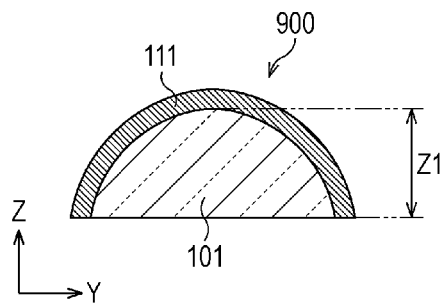
Figure 10E:
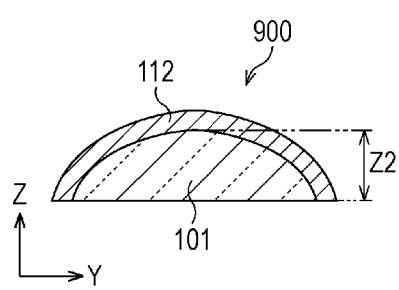

A tenth embodiment will be described. FIGS. 10A to 10E are drawings illustrating a structure of an optical element according to the tenth embodiment. FIG. 10A is a top view, FIG. 10B is a cross-sectional view taken along the line XB-XB in FIG. 10A, and FIG. 10C is a cross-sectional view taken along the line XC-XC in FIG. 10A. FIG. 10D is a cross-sectional view taken along the line XD-XD in FIG. 10A, and FIG. 10E is a cross-sectional view taken along the line XE-XE in FIG. 10A. In the tenth embodiment, same components as in the first embodiment are denoted by the same reference numerals and description thereof is omitted.

In the tenth embodiment, the convex lens 101 is provided with two ridgelines 901 extending from the apex 104. The ridgelines 901 extend in a direction inclining from on a Y-axis toward the first end 102. The boundary between the first anti-reflection structure 111 and the second anti-reflection structure 112 is located on the ridgelines 901. Other configurations are the same as those in the ninth embodiment.

The same advantages and effects as those in the ninth embodiment are achieved with the tenth embodiment as described above.

Eleventh Embodiment

An eleventh embodiment will be described. FIG. 11 is a top view illustrating a structure of an optical element array of the eleventh embodiment.

An optical element array 1000 includes a plurality of the optical elements 100. The optical elements 100 are assumed to be the optical element of the first embodiment. The optical element array 1000 includes an array region 1001, which is the flat XY plane. The plurality of optical elements 100 are arranged over the entire surface of the array region 1001 at a distance from each other from a center 1002 toward the outside of the array region 1001. The optical elements 100 each are arranged so that the first end 102 comes on the center 1002 side and the second end 103 comes on the side away from the center 1002. Therefore, the optical elements 100 on the optical element array 1000 are each provided on the surface thereof with the first anti-reflection structure 111 on the side closer from the center 1002 and the second anti-reflection structure 112 on the side away from the center 1002. The light transmittance of the second anti-reflection structure 112 is greater than the light transmittance of the first anti-reflection structure 111.

According to the eleventh embodiment as described above, the oblique-incidence light beam falling on the periphery of the array region 1001 may be passed and converged with a small light loss. Instead of the optical element 100 of the first embodiment, the optical elements of the second to tenth embodiments may be employed.

The optical element array 1000 of the eleventh embodiment may constitute the solid-state image-pickup apparatus provided with the optical element array 1000 and the solid-state image-pickup apparatus by being used, for example, together with the solid-state image-pickup element provided with a plurality of photoelectric conversion portions which correspond to the optical elements 100 respectively.

Although the preferred embodiments of this disclosure have been described thus far, this disclosure is not limited to those embodiments, and various modifications, variations, or combinations may be made within the scope of this disclosure. This disclosure may be applied to a downward projecting convex lens, and in this case, the bottom face may be considered as an upper face.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-077036, filed Apr. 3, 2014, which is hereby incorporated by reference herein in its entirety.

What is claimed is:

1. An optical element comprising:
   a bottom face;
   a convex lens including a projecting surface attached to the bottom face;
   an anti-reflection structure configured to cover the projecting surface; and
   an orthogonal projection of an apex of the projecting surface onto the bottom face being located on a line segment connecting a first end located on an outer edge of the bottom face and a second end located on the outer edge of the bottom face, and being located on the first end side with respect to a center point of the line segment, wherein
   the anti-reflection structure includes:
   a first anti-reflection structure on the first end side with respect to the apex, and
   a second anti-reflection structure on the second end side with respect to the apex, and wherein
   a light transmittance of the second anti-reflection structure is greater than a light transmittance of the first anti-reflection structure, and
   the first anti-reflection structure and the second anti-reflection structure do not overlap in plan view.

2. The optical element according to claim 1, wherein
   the anti-reflection structure includes a third anti-reflection structure located between the first anti-reflection structure and the second anti-reflection structure, and
   the light transmittance of the second anti-reflection structure is greater than a light transmittance of the third anti-reflection structure.

3. The optical element according to claim 2, wherein the third anti-reflection structure covers the apex of the projecting surface.

4. The optical element according to claim 1, wherein a convex lens width at the second end is smaller than a convex lens width of the orthogonal projection of the apex where a size of the bottom face in a direction orthogonal to the line segment is a convex lens width.

5. The optical element according to claim 1, wherein the convex lens width at the second end is smaller than a convex lens width at the first end where the size of the bottom face in the direction orthogonal to the line segment is the convex lens width.

6. The optical element according to claim 1, wherein the first anti-reflection structure and the second anti-reflection structure are formed by a CVD method.

7. A solid-state image-pickup apparatus comprising:
   a plurality of photoelectric conversion portions; and
   an optical element array located above the plurality of photoelectric conversion portions and including a plurality of the optical elements according to claim 1 arranged thereon.

8. An optical element array comprising:
   a plurality of optical elements located in an array region at a distance from each other, wherein
   each of the plurality of optical elements includes:
   a convex lens including a bottom face and a projecting surface;
   an anti-reflection structure configured to cover the projecting surface; and
   an orthogonal projection of an apex of the projecting surface onto the bottom face being located on a line segment connecting a first end located on an outer edge of the bottom face and a second end located on the outer edge of the bottom face at a position further from the center of the array region than the first end, and being located on the first end side with respect to a center point of the line segment, wherein
   the anti-reflection structure includes:
   a first anti-reflection structure on the first end side with respect to the apex,
   a second anti-reflection structure on the second end side with respect to the apex, and wherein
   a light transmittance of the second anti-reflection structure is greater than a light transmittance of the first anti-reflection structure, and
   the first anti-reflection structure and the second anti-reflection structure do not overlap in plan view.

9. A solid-state image-pickup apparatus comprising:
   a plurality of photoelectric conversion portions disposed in an array region; and
   an optical element array provided on the plurality of photoelectric conversion portions and including a plurality of optical elements, wherein
   each of the plurality of optical elements includes:
   a convex lens including a bottom face and a projecting surface; and
   an anti-reflection structure configured to cover the projecting surface; and
   an orthogonal projection of an apex of the projecting surface onto the bottom face being located on a line segment connecting a first end located on an outer edge of the bottom face and a second end located on the outer edge of the bottom face at a position further from the center of the array region than the first end, and being located on the first end side with respect to a center point of the line segment, wherein
   the anti-reflection structure includes:
   a first anti-reflection structure on the first end side with respect to the apex, and a second anti-reflection structure on the second end side with respect to the apex, and wherein a light transmittance of the second anti-reflection structure is greater than a light transmittance of the first anti-reflection structure, and the first anti-reflection structure and the second anti-reflection structure do not overlap in plan view.

10. An optical element, which is among a plurality of optical elements, arranged in a peripheral part of an array region in which the plurality of optical elements is arranged, the optical element comprising:

a lens including a projecting surface; and an anti-reflection structure configured to cover the lens, wherein the lens includes a first end and a second end, the first end being disposed on a side closer to a center of the array region than the second end and the second end being disposed on a side farther away from the center of the array region than the first end, wherein a distance between an orthogonal projection of an apex of the lens and the first end is shorter than a distance between the orthogonal projection of the apex of the lens and the second end, wherein, in the anti-reflection structure, a portion arranged on a side of the first end with respect to the apex is thinner in film thickness than a portion arranged on a side of the second end with respect to the apex, and wherein, in the anti-reflection structure, the portion arranged on the side of the second end with respect to the apex is higher in a light transmittance than the portion on the side of the first end with respect to the apex.

11. The optical element according to claim 10, wherein, in the anti-reflection structure, the portion arranged on the side of the first end with respect to the apex and the portion arranged on the side of the second end with respect to the apex are formed of the same material.

12. The optical element according to claim 11, wherein the anti-reflection structure is formed of oxide silicon.

13. The optical element according to claim 11, wherein the anti-reflection structure is formed by a chemical vapor deposition (CVD) method.

14. A solid-state image-pickup apparatus, comprising:

a plurality of photoelectric conversion portions; and an optical element array located above the plurality of photoelectric conversion portions and including a plurality of the optical elements according to claim 10 arranged thereon.

* * * * *